United States Patent
Kaveti et al.

(10) Patent No.: US 11,755,837 B1
(45) Date of Patent: Sep. 12, 2023

(54) EXTRACTING CONTENT FROM FREEFORM TEXT SAMPLES INTO CUSTOM FIELDS IN A SOFTWARE APPLICATION

(71) Applicant: INTUIT INC., Mountain View, CA (US)

(72) Inventors: Naveen Kumar Kaveti, Bangalore (IN); Shrutendra Harsola, Madhya Pradesh (IN); Poorvi Agrawal, Bangalore (IN); Vikas Raturi, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/733,368

(22) Filed: Apr. 29, 2022

(51) Int. Cl.
*G06F 40/30* (2020.01)
*G06F 40/279* (2020.01)
*G06N 3/08* (2023.01)
*G06N 20/00* (2019.01)
*G06N 5/022* (2023.01)

(52) U.S. Cl.
CPC .......... *G06F 40/279* (2020.01); *G06F 40/30* (2020.01); *G06N 5/022* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | |
|---|---|---|---|
| 6,609,128 B1 * | 8/2003 | Underwood | G06F 9/454 707/610 |
| 6,718,535 B1 * | 4/2004 | Underwood | G06F 9/451 717/101 |
| 7,100,195 B1 * | 8/2006 | Underwood | H04L 63/0823 707/999.009 |

(Continued)

OTHER PUBLICATIONS

Mohammed et al., title={Lsa \& lda topic modeling classification: Comparison study on e-books}, journal={Indonesian Journal of Electrical Engineering and Computer Science}, volume={19}, number={1}, pages={353--362}, year={2020}, publisher={Institute of Advanced Engineering and Science} (Year: 2020).*

(Continued)

*Primary Examiner* — Lamont M Spooner
(74) *Attorney, Agent, or Firm* — Patterson + Sheridan, LLP

(57) ABSTRACT

Certain aspects of the present disclosure provide techniques for training and using a machine learning model to extract relevant textual content for custom fields in a software application from freeform text samples. An example method generally includes generating, via a natural language processing pipeline, a training data set from a data set of freeform text samples and field entries for a plurality of custom fields defined in a software application. A first machine learning model is trained to identify custom fields for which relevant data is included in freeform text. A second machine learning model is trained to extract content from the freeform text into one or more custom fields of the plurality of custom fields defined in the software application and identified by the first machine learning model as custom fields for which relevant data is included in the freeform text.

18 Claims, 6 Drawing Sheets

(56) References Cited

U.S. PATENT DOCUMENTS

| | | | | |
|---|---|---|---|---|
| 8,887,291 B1* | 11/2014 | Mears | G06Q 10/00 |
| | | | 713/182 |
| 10,832,656 B1* | 11/2020 | Shaya | G10L 15/04 |
| 10,929,896 B1* | 2/2021 | Nath | G06F 16/951 |
| 11,120,512 B1* | 9/2021 | Dutt | G06F 40/186 |
| 11,263,229 B1* | 3/2022 | Basavaiah | G06F 16/2477 |
| 2007/0268522 A1* | 11/2007 | Miyamoto | G06F 40/174 |
| | | | 358/1.18 |
| 2014/0372861 A1* | 12/2014 | Lawless | G06F 40/143 |
| | | | 715/224 |
| 2015/0261854 A1* | 9/2015 | Mihai | G06F 16/38 |
| | | | 707/803 |
| 2016/0019197 A1* | 1/2016 | Iasi | G06F 40/174 |
| | | | 715/224 |
| 2016/0217119 A1* | 7/2016 | Dakin | G06F 40/274 |
| 2016/0300573 A1* | 10/2016 | Carbune | G10L 17/22 |
| 2017/0192948 A1* | 7/2017 | Gaither | G06F 40/174 |
| 2018/0103055 A1* | 4/2018 | Keohane | G06Q 50/265 |
| 2019/0050741 A1* | 2/2019 | Mewes | G06N 20/00 |
| 2019/0129931 A1* | 5/2019 | Hegde | G06F 40/186 |
| 2019/0155894 A1* | 5/2019 | Gandhi | G06F 40/106 |
| 2019/0294720 A1* | 9/2019 | Beringer | G06F 16/26 |
| 2019/0354718 A1* | 11/2019 | Chandnani | G06F 21/6254 |
| 2019/0361682 A1* | 11/2019 | Cavalcante | H04M 7/0048 |
| 2019/0385054 A1* | 12/2019 | Zuev | G06F 40/30 |
| 2020/0074169 A1* | 3/2020 | Mukhopadhyay | G06F 18/22 |
| 2020/0097616 A1* | 3/2020 | Asur | G06F 40/295 |
| 2020/0167154 A1* | 5/2020 | Nagar | G06F 8/36 |
| 2020/0218855 A1* | 7/2020 | Melehy | G06F 40/117 |
| 2020/0250576 A1* | 8/2020 | Jagota | G06Q 10/107 |
| 2020/0250687 A1* | 8/2020 | Jagota | G06N 3/084 |
| 2020/0380022 A1* | 12/2020 | Ramakrishna | G06F 16/328 |
| 2021/0133904 A1* | 5/2021 | Saliba | G06F 16/182 |
| 2021/0192129 A1* | 6/2021 | Garg | G06F 40/174 |
| 2021/0192395 A1* | 6/2021 | Sainani | H04L 41/22 |
| 2021/0383067 A1* | 12/2021 | Reisswig | G06F 40/14 |
| 2021/0397634 A1* | 12/2021 | Gerber, Jr. | G06F 16/353 |
| 2022/0035775 A1* | 2/2022 | Sriharsha | G06F 16/252 |
| 2022/0035864 A1* | 2/2022 | Morton | G06F 40/284 |
| 2022/0036002 A1* | 2/2022 | Sriharsha | G06N 5/04 |
| 2022/0036177 A1* | 2/2022 | Sriharsha | G06N 3/10 |
| 2022/0044812 A1* | 2/2022 | Barnes | G16H 50/20 |
| 2022/0084664 A1* | 3/2022 | Ginsburg | G16H 15/00 |
| 2022/0122010 A1* | 4/2022 | Barcelos | G06N 3/045 |
| 2022/0156245 A1* | 5/2022 | Saimani | G06F 16/2272 |
| 2022/0156456 A1* | 5/2022 | Gadiya | G06F 40/186 |
| 2022/0179665 A1* | 6/2022 | Rathod | G06F 9/451 |
| 2022/0309109 A1* | 9/2022 | Benincasa | G06F 40/205 |
| 2022/0309276 A1* | 9/2022 | Kumar | G06F 18/2431 |

OTHER PUBLICATIONS

Bert et al., title={Bert: Pre-training of deep bidirectional transformers for language understanding}, journal={arXiv preprint arXiv:1810.04805}, year={2018}, pp. 1-16. (Year: 2018).*

* cited by examiner

EXTRACTING CONTENT FROM FREEFORM TEXT SAMPLES INTO CUSTOM FIELDS IN A SOFTWARE APPLICATION

INTRODUCTION

Aspects of the present disclosure generally relate to data extraction in software applications, and more specifically to extracting data from freeform text samples into custom fields in a software application.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on.

Many software applications include the ability for users to define custom data fields in which data can be stored and which can be used for various purposes, such as recording structured information or information based on which various actions can be taken (e.g., to filter data in the software application, generate custom reports for the data, and so on). For example, in an accounting application, a user might define various custom fields for storing data such as a purchase order number, the person(s) responsible for a sale, or other relevant information for which a user may wish to use for various processing and analytics purposes. However, while a software application may provide an ability to define custom data fields, users of a software application may not define custom data fields. Further, even when users do define custom data fields in the software application, users may not use the custom data fields and instead continue to store relevant data in freeform text samples instead of in the custom data fields.

Accordingly, techniques are needed to extract data from freeform text samples into structured data fields that can be used within a software application for various purposes.

BRIEF SUMMARY

Certain embodiments provide a computer-implemented method for training a machine learning model to extract relevant textual content for custom fields in a software application from freeform text samples. An example method generally includes generating, via a natural language processing pipeline, a training data set from a data set of freeform text samples and field entries for a plurality of custom fields defined in a software application. Each entry in the training data set generally includes a mapping between a custom field name and relevant textual content in a freeform text sample in the data set. A first machine learning model is trained based on the training data set to identify custom fields for which relevant data is included in freeform text. A second machine learning model is trained based on the training data set to extract content from the freeform text into one or more custom fields of the plurality of custom fields defined in the software application and identified by the first machine learning model as custom fields for which relevant data is included in the freeform text.

Other embodiments provide a computer-implemented method for extracting relevant textual content for custom fields in a software application from freeform text samples using a machine learning model. The method generally includes receiving a freeform text sample. Using a first machine learning model, custom fields in a software application for which relevant content is included in the freeform text sample are identified. Mappings between the identified custom fields and relevant content in the freeform text sample are extracted based on a second machine learning model trained to extract content from freeform text into the custom fields in the software application. For each respective mapping between a respective custom field and respective relevant content, the respective custom field is updated with the respective relevant content in the freeform text sample.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
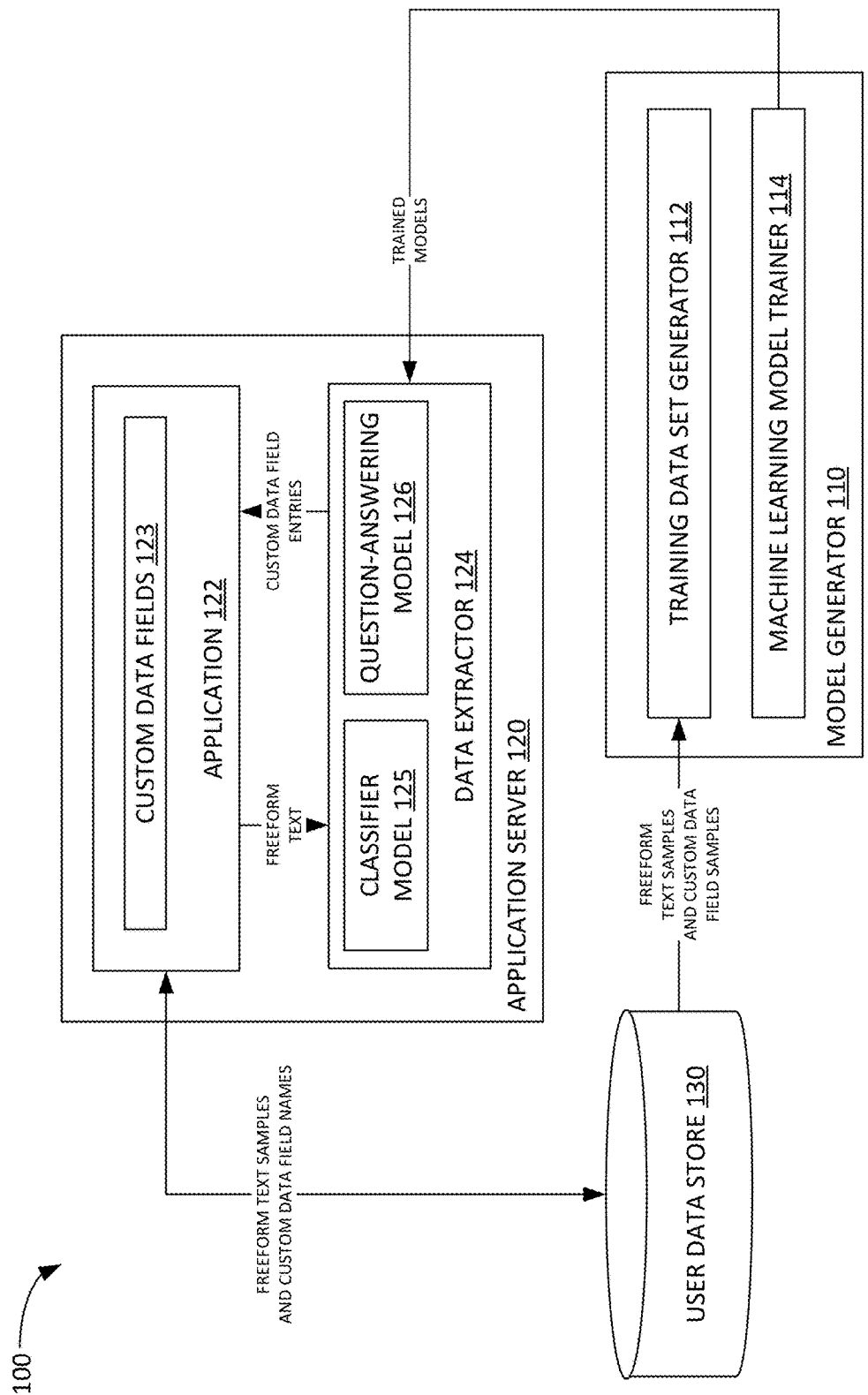
FIG. 1 illustrates a system in which a machine learning model is trained and used to extract relevant textual content for custom data fields defined in a software application from freeform text samples.

Aspects of the present disclosure provide apparatuses, methods, processing systems, and computer-readable mediums for training and using machine learning models to extract relevant content for custom data fields in a software application from freeform text samples.

In many software applications, custom data fields may be defined to allow users of a software application to record custom information in a structured format. Data stored in these custom fields may allow users of the software application to perform various actions using this data, such as various processing or analytics purposes, such as identifying trends in the data stored in these custom data fields, generate reports based on the data stored in these custom data fields, and the like. However, while software applications may allow users to define custom data fields, users may not leverage this functionality. Further, users who do define custom data fields in the software application may continue to store data in fields other than these custom data fields. For example, in an invoicing application, users may continue to store data for which custom data fields have been defined in various freeform text fields, such as a memorandum fields, line item fields, or other data fields in which unstructured data can be stored in any format.

Because each user of a software application can generate different names for custom data fields that store the same data, extracting data from freeform text into custom data fields may be a difficult task. For example, machine learning models that use natural language processing techniques may be able to extract data from freeform text into custom data fields that have defined names. Because these machine learning models may require that custom data fields have specific names, these machine learning models may not successfully extract data for the variety of custom data fields that may be defined by users of the software application for the same type of data. To use one example, a machine learning model may be trained to extract data for a custom data field named "purchase order number". The machine learning model may not recognize other semantically similar text, such as "P.O. Number", "Purchase Order #", or the like, and thus, relevant text may not be extracted into the custom data field.

Embodiments presented herein provide techniques for training and using machine learning models that can extract relevant text from freeform data for any of a plurality of custom data fields defined by users of a software application and for any permutation of a custom data field name. A first model can determine whether relevant text exists for a custom data field in a freeform text sample. If relevant text exists for the custom data field in the freeform text sample, a second model extracts the relevant text, and the custom data field may then be populated with the relevant text extracted from the freeform text sample. For example, if a "Sales Representative" field is defined in an invoicing application, and a user enters "John will be a sales contact" in a memorandum field in the invoicing application, the machine learning models described herein will recognize "John" as relevant to the "Sales Representative" field and automatically populate the "Sales Representative" field with the value "John". These same machine learning models can also recognize other custom fields defined in the invoicing application and automatically populate these custom fields with data extracted from an entry in a freeform text field, such as the memorandum field discussed above.

Further, the first model and second model may be used to extract relevant textual content for custom fields defined by any user of a software application, and custom models may not need to be trained for each user of the software application based on the specific custom field names that any specific user has defined in the software application. Thus, embodiments of the present disclosure may accurately extract relevant textual data into the relevant custom data fields using a single set of models. Because a single set of models may be trained and used for different users of a software application, embodiments described herein may reduce processor utilization, memory usage, network bandwidth usage, and other resource usage that may be wasted by training customized models for each user of the software application.

Example Training and Using Machine Learning Models to Extract Relevant Text into Custom Data Fields in a Software Application FIG. 1 illustrates an example computing environment 100 in which a predictive model is trained and used to extract relevant text from freeform text samples into custom data fields in a software application. As illustrated, computing environment 100 includes a model generator 110, an application server 120, and a user data store 130.

Model generator 110 is generally representative of one or more physical or virtual computing devices which can generate training data sets from collections of freeform text samples and custom data field names and train machine learning models to identify custom data fields included in a freeform text sample and extract relevant data from the freeform text sample into the identified custom data fields. As illustrated, model generator 110 includes a training data set generator 112 and a machine learning model trainer 114.

Training data set generator 112 is generally configured to generate a training data set for training machine learning models to identify and extract relevant text from freeform text samples into custom data fields in the software application. The training data set may be generated based on a plurality of freeform text samples generated by a plurality of users of application 122 and custom data fields defined by the plurality of users of application 122.

To generate the training data set, training data set generator 112 can ingest a data set of freeform text samples and a set of custom data field names from user data store 130. Generally, the set of freeform text samples may include, for example, text samples stored in one or more designated freeform text entry fields defined in application 122. In some aspects, training data set generator 112 can ingest the data set of freeform text samples and determine, based on various language processing models, whether each sample in the freeform text includes data relevant to a custom field or not.

Training data set generator 112 can use a natural language processing pipeline (e.g., a text mining algorithm) and the set of custom field names to determine whether each freeform text sample in the data set of freeform text samples includes data relevant to one or more custom fields in a software application. Generally, the text mining algorithm may ingest a freeform text sample and semantically compare strings or substrings in the freeform text sample to names of custom fields in the set of custom field names. If the text mining algorithm determines that a freeform text sample does not include data relevant to one or more fields in the software application, the freeform text sample may be removed from the data set of freeform text samples. Otherwise, the freeform text sample may be retained for use in generating a labeled training data set for use in training the machine learning models, as discussed in further detail below.

For example, suppose that the universe of custom field names includes fields named "Purchase Order Number", "Sales Representative", and "Delivery Date". Training data set generator 112 can determine that a freeform text sample that reads "Widget, silver, 12.7 mm diameter" does not include relevant text because no word or combination of words in the freeform text sample semantically matches any of the fields in the universe of custom fields. However, a freeform text sample that reads "Purchase Order Number: 12799; Sales Representative: Joe Smith" would be recognized by training data set generator 112 as a freeform text sample including relevant text for one or more custom data fields (e.g., the "Purchase Order Number" and "Sales Representative" custom data fields) because the freeform text sample includes a words or combinations of words that semantically match at least one of the custom field names in the universe of custom field names.

Training data set generator 112 generally processes the set of custom field names against user inputs into custom fields to generate the training data set used to train the machine learning models. Generally, the training data set may be a labeled training data set that allows for supervised training of the machine learning models, as discussed in further detail below. To generate entries in the training data set, training data set generator 112 can generate pairings between a freeform text sample in the data set of freeform text samples and a custom field name defined in application 122 and map this pairing to the user input into the relevant custom field.

For example, suppose that a freeform text sample includes the text: "Sales Order No. 1234 and Sales Executive Name: John", and the universe of custom data fields defined in the application are "Sales Order Number", "Purchase Order Number", "Sales Executive Name", and "Delivery Date". Training data set generator 112 can generate four entries in the training data set for this freeform text sample and the universe of custom data fields. A first entry may map the freeform text sample and the field named "Sales Order Number" to relevant text in the freeform text sample; a second entry may map the freeform text sample and the field named "Purchase Order Number" to relevant text in the freeform text sample; a third entry may map the freeform text sample to the field named "Sales Executive Name"; and a fourth entry may map the freeform text sample to the field named "Delivery Date". In this example, the fields named "Sales Executive Name" and "Sales Order Number" include textual content (e.g., "John" in the field named "Sales Executive Name" and "123" in the field named "Sales Order Number"), and the fields named "Purchase Order Number" and "Delivery Date" do not include textual content. Thus, the following mappings may be generated to reflect the associations between the freeform text sample and the universe of custom data fields defined in the application:

{"Sales Order No. 1234 and Sales Executive Name: John", "Sales Order Number" }→12345
{"Sales Order No. 1234 and Sales Executive Name: John", "Purchase Order Number" }→null
{"Sales Order No. 1234 and Sales Executive Name: John", "Sales Executive Name" }→John
{"Sales Order No. 1234 and Sales Executive Name: John", "Delivery Date" }→null In some aspects, the mappings illustrated above may be structured as n-tuples of data that can be used to train machine learning models to determine whether relevant content for a custom data field in an application exists in a freeform text sample and to extract the relevant content for the custom data field from the freeform text sample. In such a case, the following tuples may be generated:

{"Sales Order No. 1234 and Sales Executive Name: John", "Sales Order Number", 12345}
{"Sales Order No. 1234 and Sales Executive Name: John", "Purchase Order Number", null}
{"Sales Order No. 1234 and Sales Executive Name: John", "Sales Executive Name", John}
{"Sales Order No. 1234 and Sales Executive Name: John", "Delivery Date", null}

As illustrated above, where a custom data field includes relevant textual content, the pairing of the freeform text sample and custom data field name may be mapped to the content included in the custom data field. Where a custom data field, however, does not include relevant textual content, the pairing of the freeform text sample and the custom field name may be mapped to a null value or other value indicating that no match exists.

In some aspects, training data set generator 112 can identify custom data field names in freeform text samples using a topic modeling algorithm (e.g., a Latent Dirichlet allocation model), an nGram model, text similarity algorithms, or the like. These topic modeling algorithms generally extract topics from a collection of text samples by identifying relationships between different text samples in the collection of text samples. In this case, the topics may be the names of custom data fields, and the text samples from which these topics may be extracted may include a plurality of freeform text samples generated by users of application 122. Generally because different users may assign different custom field names for the same type of data, these topic modeling algorithms may allow for any variant of a custom field name for a specific type of data to be recognized as a custom data field for that specific type of data. For example, similar users (e.g., users in the same industry) may use similar names for a specific type of data, and similarity scores generated by topic modeling algorithms or text similarity algorithms can be used to identify words or sequences of words corresponding to a custom field name in a text sample. Thus, training data set generator 112 may automatically extract training data samples from any data generated by any user of application 122 who has generated custom data fields and has input data as both freeform text content and custom data field entries.

In other words, training data set generator 112 can use weak supervision to automatically generate a training data set from a set of freeform text samples and a set of custom data field names defined within an application. Using weak supervision, training data set generator 112 can generate a noisy training data set from the set of freeform text samples and the set of custom data field names defined within an application. Because training data set generator 112 can generate the training data set autonomously, a manually labeled training data set need not be generated in order to train machine learning models to determine whether a freeform text input includes relevant text for a custom data field and to extract the relevant text for the custom data field.

Machine learning model trainer 114 generally uses the training data set generated by data set generator 112 to train a machine learning models which can extract, from freeform text entries, relevant text for any custom data field defined by a user of application 122. In some aspects, machine learning model trainer 114 can train a first model that identifies custom fields for which relevant data is included in a freeform text sample and a second model that extracts content from a freeform text sample for a particular custom field.

In some aspects, the first model (e.g., classifier model 125) may be a classifier model that is trained to predict, from a freeform text input, whether a freeform text sample includes content relevant to a specified custom data field. The classifier model may be trained based on the training data set generated using weak supervision by training data set generator 112 to classify a freeform text sample as a sample that contains relevant content or a sample that does not contain relevant content. The classifier model may be trained to use fuzzy text matching logic between words in the freeform text sample and the names of custom data fields defined for the first model to determine whether a freeform text sample includes relevant textual content for a model. By using fuzzy text matching, the first model may be able to classify a freeform text sample as including (or not including) relevant textual content for a specific custom data field regardless of the varying name permutations that may be assigned to that specific custom data field.

The second model (e.g., question-answering model 126) may be trained to extract relevant textual content for custom data fields specified in a freeform text sample. Generally, the second model may be a question-answering model in which the combination of the freeform text sample and name of the custom data field is the question and the relevant text is the answer. The question-answering model may be implemented, for example, by a Bidirectional Encoder Representation from Transformers (BERT) model, a distilled BERT model (e.g., a model that uses knowledge distillation techniques to generate a model that is smaller in size than a typical BERT model), or other techniques that converts an input of the freeform text sample and name of the custom data field into an embedding representing the input, encodes the embedding via a transformer encoder, and generates a classification based on the embedding into which the freeform text sample and name of the custom data field are embedded.

Generally, the output of the second model may include a plurality of substrings from the freeform text sample, and each substring may be represented by a start position and an end position. The number of substrings representing candidate answers to a question of extracting relevant text for a specified custom data field from a freeform text sample may be defined apriori as a hyperparameter of the second model (e.g., as the n candidate answers having a highest likelihood of being relevant content for a given custom data field). For each answer of the candidate answers, the model may be configured to check the validity of the answer and discard invalid answers, such as answers for which the end position is before the beginning position. Each start position and end position may be associated with a logit calculated by the model, representing a probability of the start position and end position being an accurate starting and ending position for a relevant portion of text in the freeform text sample, and a score for each candidate answer may be calculated based on the logits associated with the start position and end position each candidate answer. The model may be trained to sort answers in decreasing order of the scores for each candidate answer, and the answer with the highest score may be selected as the answer to the question of extracting relevant text for a specified custom data field from a freeform text sample. In some aspects, the model may further be trained to output an answer if the score for an answer exceeds a threshold value. This threshold value may also be defined apriori as a hyperparameter of the second model.

The first and second machine learning models discussed above may be trained for use by any user of application 122 regardless of the names of custom data fields generated by these users of application 122. Because the first and second machine learning models need not be customized for a specific user of application 122, a single instance of the first machine learning model and a single instance of the second machine learning model may be trained and used across any number of users of application 122. Thus, aspects described herein may allow for a significant reduction in the computing resources needed to train machine learning models to extract relevant textual content from a freeform text string relative to training user-specific models for extracting relevant textual content into specific custom data fields defined by a specific user of application 122. Thus, the techniques discussed herein may be more computationally efficient and less resource intensive than training individual machine learning models for each user of application 122 (which may use an impractical amount of resources, for example, as the number of users of application 122 for which a model is to be trained increases over time).

After training the first model and the second model, machine learning model trainer 114 can deploy the first model and the second model (e.g., the classifier model and question-answering model discussed above) to data extractor 124 for use in identifying custom data fields included in a freeform text sample input into application 122 and extracting relevant data from the freeform text sample into the identified custom data fields in application 122.

Application server 120 is generally representative of one or more physical or virtual computing devices on which an application may be executed. Generally, application server 120 hosts an application 122, and a data extractor 124. Application 122 may be any type of application in which users can define custom data fields and enter data into one or more data fields in the application for commitment to user data store 130.

In some aspects, application 122 may monitor for the input of freeform text samples into data fields that can support the entry of unstructured data. For example, in an invoicing application, these data fields may include fields such as a line item description field, a memorandum field, or other field in which data is not expected to be input in a particular format. When application 122 detects that a freeform text sample has been input in a data field that supports the entry of unstructured data, application 122 can provide the freeform text sample to data extractor 124 to determine whether the freeform text sample includes data relevant to one or more custom fields defined in the application and can receive, from data extractor 124, information identifying data to insert into custom data fields 123 from the freeform text sample. When application 122 receives this information from data extractor 124, application 122 can populate the custom data fields 123 with the relevant textual information extracted by data extractor 124, which may allow a user to perform various processing and analytical tasks in application 122 based on data extracted from these freeform text samples.

In some aspects, application 122 can also or alternatively support data extraction on an on-demand basis. In such a case, application 122 can instruct data extractor 124 to extract data from selected freeform text samples and can populate custom data fields 123 based on relevant data extracted from the selected freeform text samples. Using an invoicing application as an example again, a user can select specific invoices for which data is to be extracted from freeform text fields into one or more custom data fields and initiate the extraction process based on the selection of these specific invoices. In another example, application 122 can initiate data extraction processes periodically, such as doing so for each freeform text sample generated within some amount of time after the last time data extractor 124 extracted data from freeform samples into custom data fields in application 122.

Data extractor 124 generally uses the trained models deployed from machine learning model trainer 114 to determine whether a freeform text sample includes data relevant to a custom data field and, if so, to extract the relevant data from the freeform text sample. As discussed, the trained models may include a classifier model 125 that classifies a freeform text sample as a sample that includes or does not include relevant textual content for a specific custom data field. If classifier model 125 classifies a freeform text sample as a sample that does not include relevant textual content for a specific custom data field, data extractor 124 can terminate processing the freeform text sample with respect to that specific custom data field.

Otherwise, data extractor 124 can use the question-answering model 126 to identify the relevant textual content for that specific custom data field. The data extractor 124 can extract a mapping between the name of a custom data field in application 122 and the relevant content in the freeform text sample and output the mapping between the name of the custom data field and the relevant content to application 122 for use in updating the data stored in user data store 130 for a user of application 122.

In some aspects, data extractor 124 can identify a set of custom field names from a freeform text sample to identify the custom fields for which the question-answering model 126 is to extract relevant text from the freeform text sample. The set of custom field names may be identified, for example, based on sequences of words repeated across freeform text samples in a larger data set of freeform text samples, such as text samples generated by a user for different invoices in an invoicing application and stored in various unstructured data fields in the invoicing application, such as memorandum fields, note fields, invoice line item fields, and the like. The set of custom field names may be identified, for example, using an nGram algorithm, a topic modeling algorithm such as a Latent Dirichlet allocation model, or the like.

As discussed, the classifier model 125 and question-answering model 126 used by data extractor 124 to identify custom data fields for which relevant content exists in freeform text samples and to extract relevant textual content for custom data fields from freeform text samples may be models that can be used to extract data for any custom data field defined within an instance of application 122. The classifier model 125 and question-answering model 126 may be trained once and may be usable across a universe of users of application 122 and may not be tightly bound to the names of custom data fields in application 122. So long as a custom data field is semantically similar to a name of the custom data field (e.g., has a name that is similar in meaning, as determined by various natural language processing techniques) in the classifier model 125 and question-answering model 126, data extractor 124 can extract relevant text from a freeform text sample.

Figure 2:
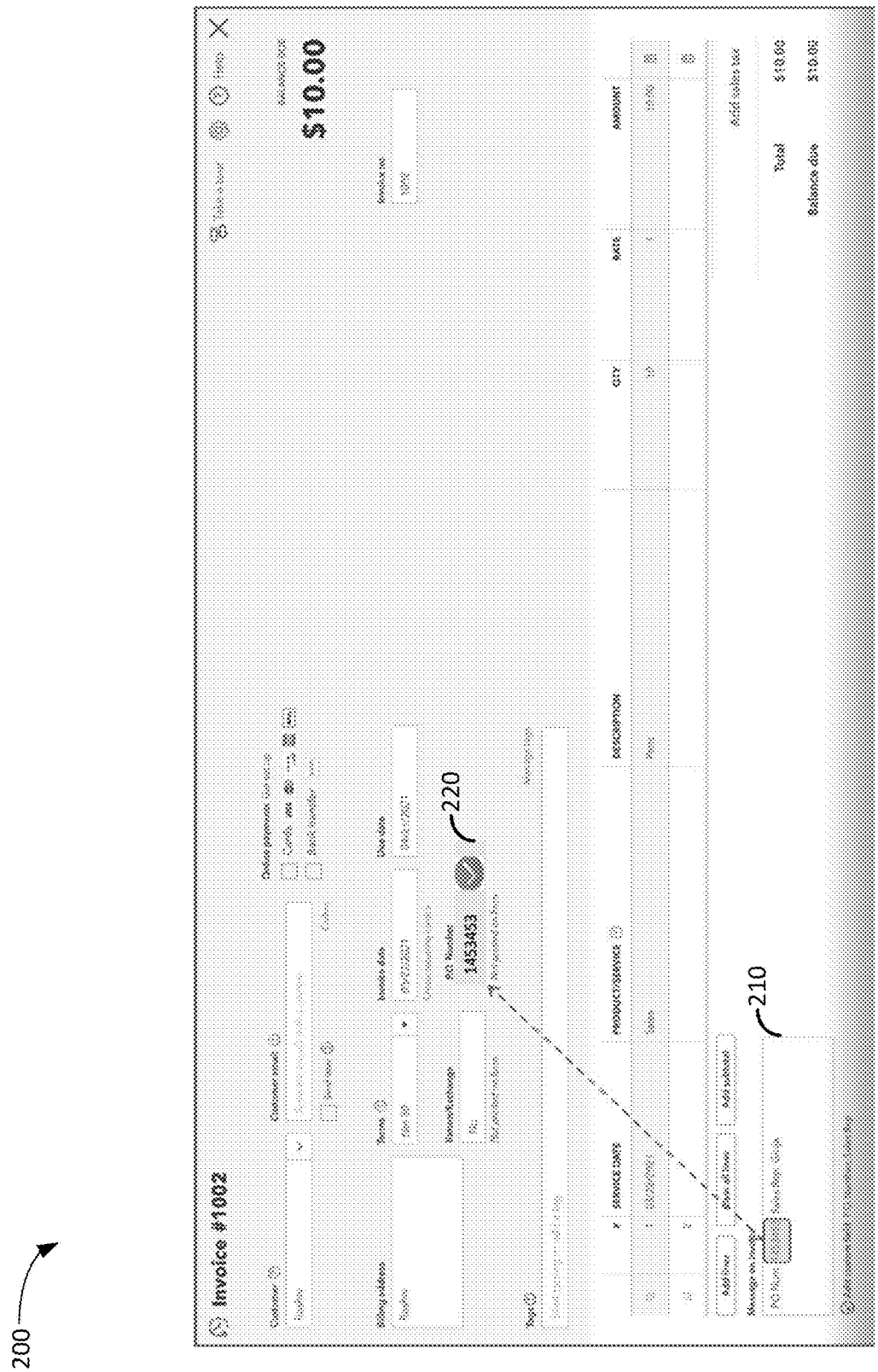
FIG. 2 illustrates an example of using machine learning models to extract relevant textual content for custom data fields defined in a software application from freeform text samples.

Example Extraction of Textual Content from Freeform Text into a Custom Data Field FIG. 2 illustrates an example of using machine learning models to extract relevant textual content for custom data fields defined in a software application from freeform text samples.

As illustrated, user interface 200 includes a memorandum field 210 in which freeform text is entered and a custom data field 220 defined by a user of a software application including user interface 200. In this example, memorandum field 210 includes the freeform text sample "PO Num: 1453543 Sales Rep: Girija." A classifier model (e.g., classifier model 125 illustrated in FIG. 1) that identifies custom field names in the freeform text sample can determine that the freeform text sample includes data for two potential custom fields: the "P.O. Number" field (e.g., corresponding to custom data field 220) and the "Sales Representative" field (not shown in user interface 200).

Because the classifier model has determined that the freeform text sample includes data for two potential custom fields, a question-answering model (e.g., question-answering model 126 illustrated in FIG. 1) can subsequently attempt to identify and extract relevant text for these custom data fields from the freeform text sample and populate custom data fields in user interface 200 with the extracted relevant text. In this example, the classifier model can determine that the relevant text for the "P.O. Number" custom field is "1453543" and the relevant text for the "Sales Representative" field is "Girija". Because the user interface 200 includes a custom data field 220 for the "P.O. Number" field, but does not include a custom data field for the "Sales Representative" field, the software application including user interface 200 can automatically fill the custom data field 220 with the extracted relevant text of "1453543". Meanwhile, the software application can take various actious with respect to the "Sales Representative" field. For example, the software application can automatically create a new custom data field in which sales representative data can be stored and then automatically populate this new custom data field with the extracted relevant text for the "Sales Representative" field. In another example, the software application can recommend to a user that a new custom data field be created for sales representative data. If the user accepts this recommendation, the software application can then automatically populate the new custom data field with the extracted relevant text for the "Sales Representative" field.

Figure 3:
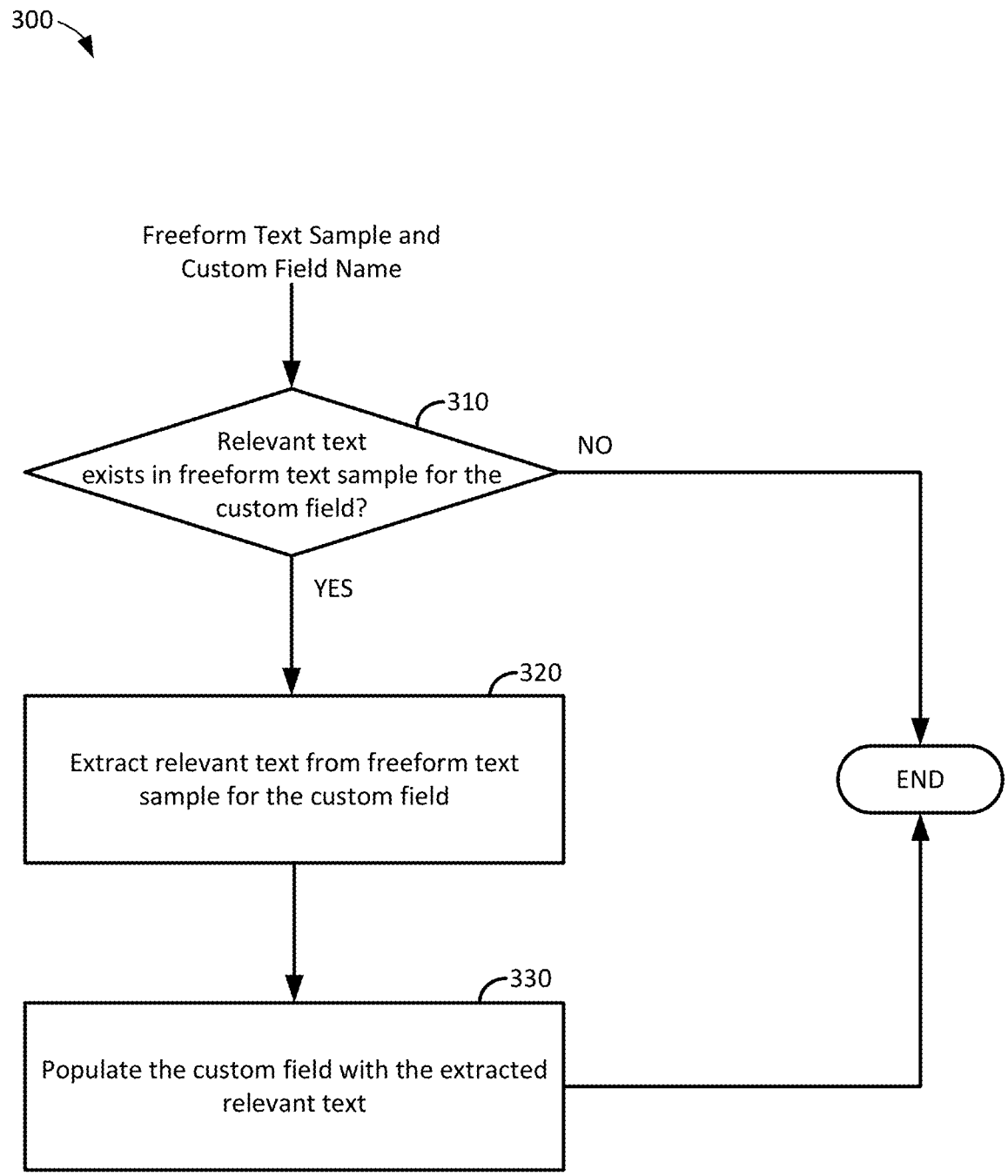
FIG. 3 illustrates an example flow chart illustrating the extraction of data from freeform text samples into custom data fields.

FIG. 3 illustrates an example flow chart of an operation 300 for extracting data from freeform text samples into custom data fields.

As illustrated, to extract data from a freeform text sample into a custom field, at block 310, a classifier model (e.g., classifier model 125 illustrated in FIG. 1) receives a freeform text sample and a custom data field name and determines whether relevant text exists in the freeform text sample for the custom data field. In some aspects, to determine whether relevant text for the specified custom data field exists in the freeform text sample, a probabilistic classifier model can be used to classify the freeform text sample as either a sample including relevant text or a sample that does not include relevant text. If the model determines that the freeform text sample likely does not include relevant text for a given custom data field, operation 300 may terminate.

Otherwise, operation 300 may proceed to block 320, where the question-answering model (e.g., question-answering model 126 illustrated in FIG. 1) extracts relevant text from the freeform text sample for the custom data field. As discussed above, a question-answering model can be used to extract the relevant text from the freeform text sample and generate a mapping between the custom data field and the relevant text. The relevant text may be a string of data in the freeform text sample identified by the question-answering model as a most likely string based on a sum of logits associated with a starting position and ending position of the string of data identified by the question-answering model. In some aspects, the question-answering model can determine whether a string is a valid string in order to reduce the number of candidate strings to analyze. For example, the model can determine that strings where a starting position is after an ending position are invalid strings and can discard these strings as potential relevant text samples for the custom data field. Further, the model can, in some cases, determine that a string is not a relevant text sample for the custom data field if a score, calculated based on the logits associated with the starting position and ending position, is less than a threshold value defined as a hyperparameter for the model.

At block 330, operations 300 proceed with populating the custom data field with the extracted relevant text. After the custom data field is populated with the relevant text extracted from the freeform text sample, a user of the software application in which the custom data field is defined can perform various processing and/or analytics tasks based on the relevant data extracted from the freeform text sample into the custom data field.

Figure 4:
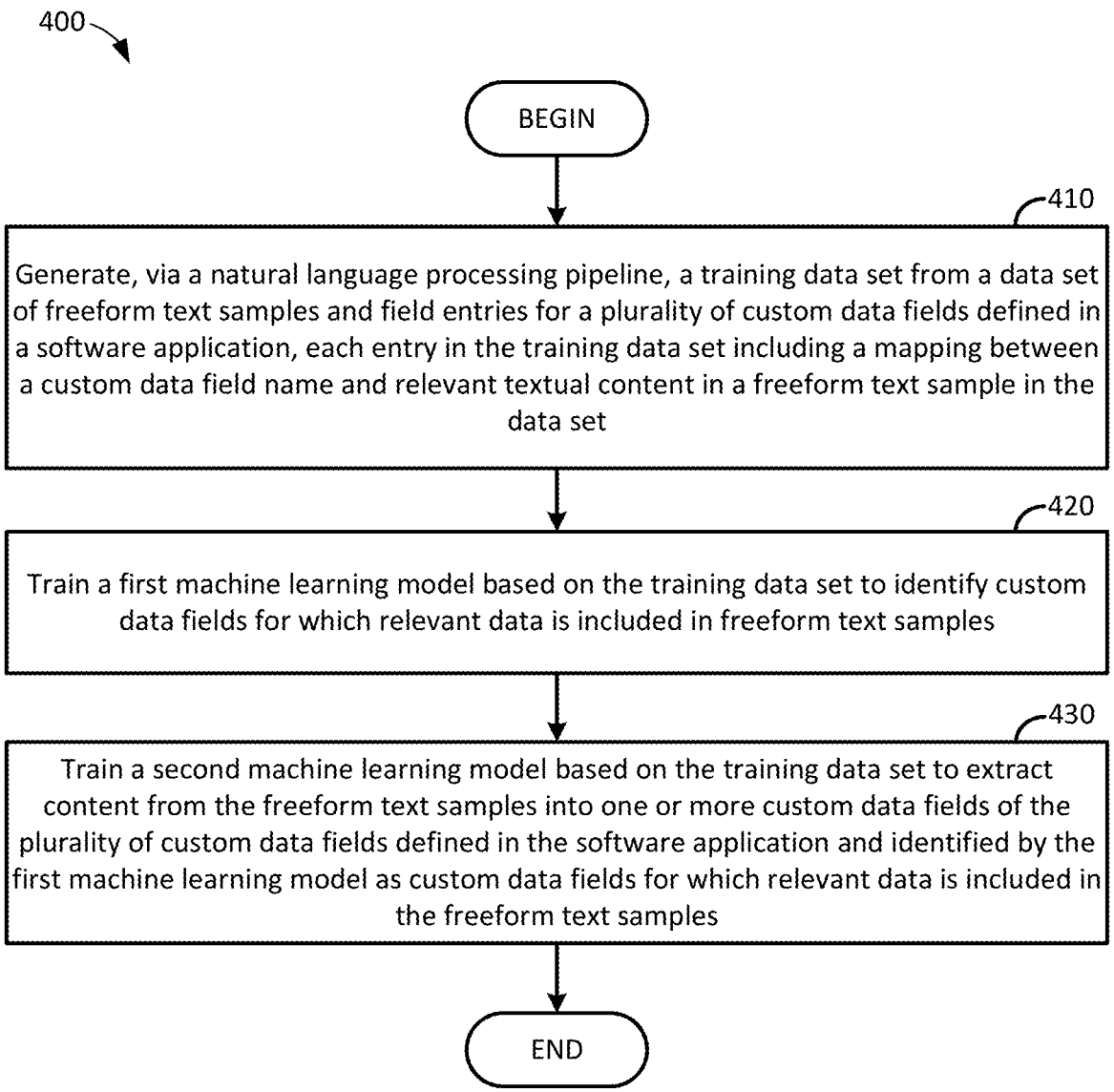
FIG. 4 illustrates an example operations for training a machine learning model to extract relevant textual content for custom data fields defined in a software application from freeform text samples.

Example Computer-Implemented Method for Training a Machine Learning Model to Extract Relevant Textual Content from Freeform Text into a Custom Data Field FIG. 4 illustrates example operations 400 for training a machine learning model to extract relevant textual content for custom data fields defined in a software application from freeform text samples. Operations 400 may be performed, for example, by training data set generator 112 and machine learning model trainer 114 illustrated in FIG. 1.

As illustrated, operations 400 begin at block 410, with generating, via a natural language processing pipeline, a training data set. The training data set may be generated from a data set of freeform text samples and field entries for a plurality of custom data fields defined in a software application. Generally, each entry in the training data set may include a mapping between a custom field name and relevant textual content in a freeform text sample in the data set.

In some aspects, the training data set may be generated individually for each respective freeform text sample in the data set of freeform text samples. For a given custom data field name, relevant textual content in the respective freeform text sample may be extracted based on the corresponding entry in the given custom data field. An entry mapping the respective freeform text sample and custom field name to the relevant textual content may then be generated. In some aspects, where a respective freeform text sample does not include relevant data, the mapping may map the respective freeform text sample and custom data field name to a null value or other value indicating that no relevant data exists in the respective freeform text sample for the custom data field.

In some aspects, the set of custom data field names may be identified based on sequences of words repeated across freeform text samples in the data set of freeform text samples. To do so, various natural language processing techniques can be used by the natural language processing pipeline to identify custom data field names and various permutations of any given custom data field name. For example, an nGram algorithm, a topic modeling algorithm (e.g., a Latent Dirichlet allocation model), or other natural language processing algorithms can be used to identify the set of custom data fields for which a machine learning model is to be trained to extract data from freeform text samples.

At block 420, operations 400 proceed with training a first machine learning model to identify custom data fields for which relevant data is included in freeform text samples. The first machine learning model may be a classifier model (e.g., classifier model 125 illustrated in FIG. 1) configured to determine whether relevant text for a custom field defined in the software application exists in the freeform text sample.

In some aspects, the first machine learning may be configured to match custom fields defined in the software application to custom fields defined in the classifier model based on fuzzy text matching. In such a case, the classifier model may be trained using a "canonical" set of custom data field names. However, because users of a software application may use names of custom data fields other than these "canonical" names (e.g., may use different names that are, in fact, semantically similar or otherwise have the same or sufficiently similar meanings), the use of fuzzy text matching techniques to match custom fields defined in the software application to custom fields defined in the classifier model may allow for a variety of custom data field names to be used without needing to train models for each specific permutation of a custom data field name.

At block 430, operations 400 proceed with training a second machine learning model (e.g., question-answering model 126 illustrated in FIG. 1) based on the training data set to extract content from the freeform text samples into one or more custom data fields of the plurality of custom data fields defined in the software application and identified by the first machine learning model as custom data fields for which relevant data is included in the freeform text samples. In some aspects, the second machine learning model may be a question-answering model that is configured to identify relevant text for the custom data field in the software application. In some aspects, the question-answering model may be a bidirectional encoder representation from transformer (BERT) model.

After the first and second machine learning models are trained, the models may be deployed for use in conjunction with a software application for which users can define custom data fields and store data relevant to these custom data fields in freeform text samples written to unstructured data fields in the software application.

Figure 5:
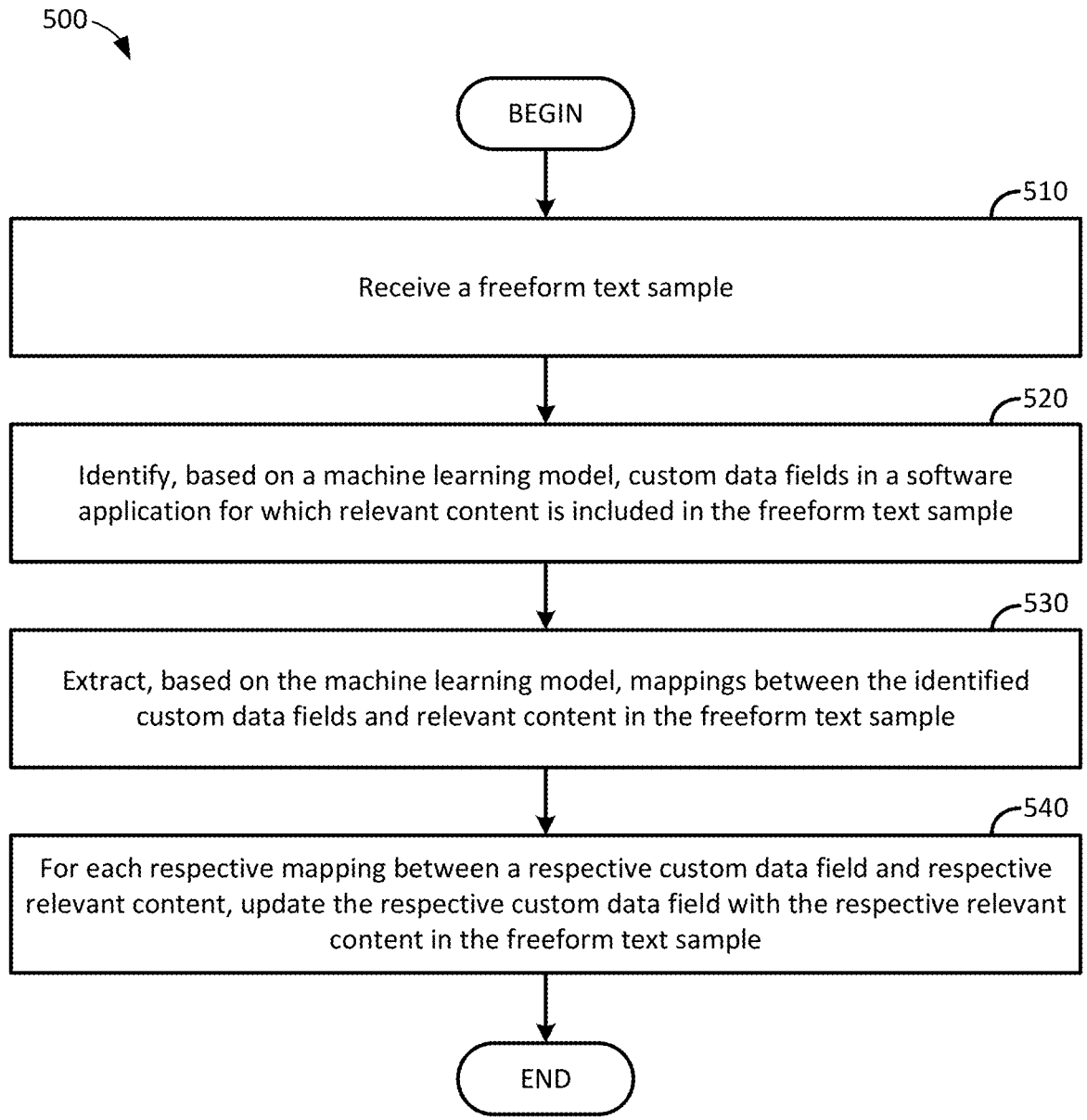
FIG. 5 illustrates example operations for extracting relevant textual content for custom data fields defined in a software application from freeform text samples using a machine learning model.

Example Computer-Implemented Method for Extracting Relevant Textual Content from Freeform Text into a Custom Data Field Using a Machine Learning Model FIG. 5 illustrates example operations 500 for extracting relevant textual content for custom data fields defined in a software application from freeform text samples using a machine learning model. Operations 500 may be performed, for example, by application 122 and/or data extractor 124 illustrated in FIG. 1.

As illustrated, operations 500 begin at block 510 with receiving a freeform text sample. The freeform text input may be received via text entry into one or more defined unstructured text fields in a software application. For example, in an invoicing application, the one or more defined unstructured text fields may include a memorandum field, an invoice line item field, or other fields in which data is not expected to be in a particular format. In some aspects, the freeform text sample may be received in real-time (e.g., as a user types the freeform text sample into one or more designated fields in which unstructured data can be entered in a software application). In some aspects, the freeform text sample may be included in a batch of freeform text samples from which relevant textual content is to be extracted.

At block 520, operations 500 proceed with identifying, based on a first machine learning model (e.g., classifier model 125 illustrated in FIG. 1), custom data fields in a software application for which relevant content is included in the freeform text sample. To identify the custom data fields for which relevant content is included in the freeform text sample, the first machine learning model can generate a predictive score for each pairing of a custom data field name and freeform text sample. Custom data fields having scores indicative of a high likelihood that the freeform text sample includes relevant content may be analyzed in further detail, as discussed below, while custom data fields having scores indicative of a low likelihood that the freeform text sample includes relevant content may be excluded from further processing.

In some aspects, the set of custom data field names may be identified based on sequences of words repeated across freeform text samples in the data set of freeform text samples. To do so, various natural language processing techniques can be used by the natural language processing pipeline to identify custom data field names and various permutations of any given custom data field name. For example, an nGram algorithm, a topic modeling algorithm (e.g., a Latent Dirichlet allocation model), or other natural language processing algorithms can be used to identify the set of custom data fields for which a machine learning model is to be trained to extract data from freeform text samples.

At block 530, operations 500 proceed with extracting mappings between the identified custom data fields and relevant content in the freeform text sample. The mappings may be extracted based on a second machine learning model (e.g., question-answering model 126 illustrated in FIG. 1) trained to extract content from freeform text into custom data fields in the software application. As discussed, the second machine learning model may be a question-answering model in which the pairing of a freeform text sample and custom data field name is the question and the relevant text in the freeform text sample is the answer.

At block 540, operations 500 proceed with updating each respective custom field with the respective relevant content in the freeform text sample for each respective mapping generated at block 530. Generally, in updating each respective custom fields with the respective relevant content, data that may be usable in various processing and analytics tasks may be extracted from freeform text samples into the custom data fields defined in an application. While data contained in freeform text samples may not be usable in these various processing and analytics tasks, data that is extracted into the custom data fields may be used, for example, to define conditions on which reports are generated, to filter data, and so on.

Figure 6:
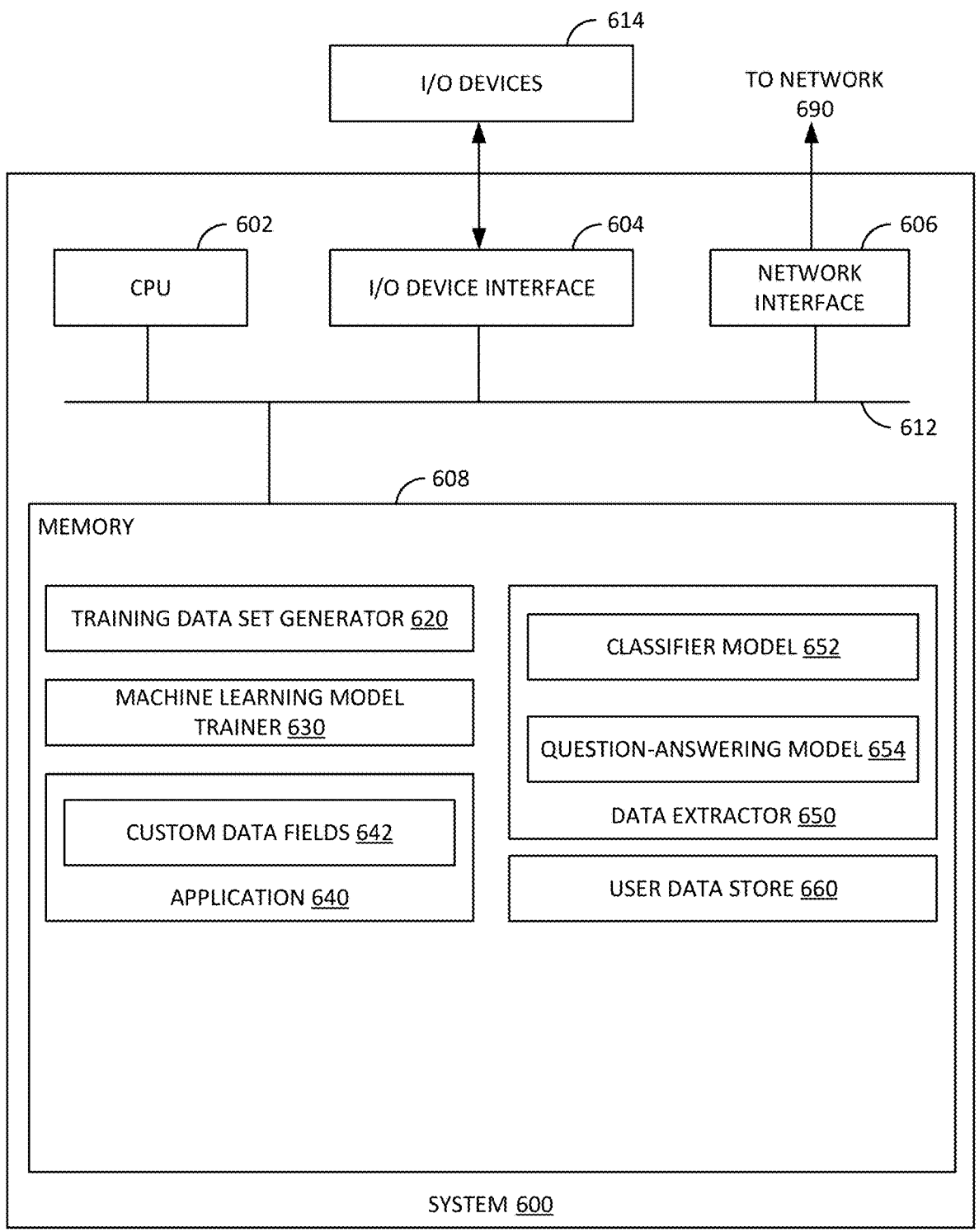
FIG. 6 illustrates an example computing system with which embodiments of the present disclosure may be implemented.

Example System for Training and Using Machine Learning Models to Extract Relevant Text from Freeform Text into Custom Data Fields in a Software Application FIG. 6 illustrates an example system 600 that trains and uses machine learning models to extract relevant text from freeform text into custom data fields in a software application. In one example, system 600 may comprise model generator 110 and application server 120 illustrated in FIG. 1. However, it should be recognized that the components of model generator 110 may be deployed in a separate system from the components of application server 120.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a training data set generator 620, a machine learning model trainer 630, an application 640, a data extractor 650, and a user data store 660.

Training data set generator 620 may correspond to training data set generator 112 illustrated in FIG. 1. Generally, training data set generator 620 ingests freeform text samples, custom data field names, and values stored in custom data fields (e.g., from user data store 660 or a remote user data store accessible via network 690) for the ingested freeform text samples to generate a training data set used to train a classifier model (e.g., classifier model 652 described below) and a question-answering model (e.g., question-answering model 654 described below). The training data set can generally generate a training data set including labeled data, where a pairing of a freeform text sample and a custom data field name is mapped to the textual content associated with the named custom data field.

Machine learning model trainer 630 may correspond to machine learning model trainer 114 illustrated in FIG. 1. Generally, machine learning model trainer 630 uses the training data set generated by training data set generator 620 to train a first model and a second model that respectively determine whether relevant text for a custom field exists in a freeform text sample and that extracts relevant text for a custom field from the freeform text sample. The first model may be a classifier model trained to classify freeform text samples into a class of samples having relevant data for a custom data field and a class of samples not having relevant data for the custom data field. The second model may be a question-answering model trained to extract relevant data from the freeform text samples for the custom data fields for which the first model determined that the freeform text samples include relevant data. After training the first and second models, machine learning model trainer 630 deploys the first and second models to data extractor 650.

Application 640 may correspond to application 122 illustrated in FIG. 1. Generally, application 640 may allow for users to define custom data fields 642 in which custom data is entered into the application (e.g., for storage in user data store 660). When users enter freeform text samples into unstructured data entry fields in application 640, application 640 can pass the freeform text samples to data extractor 650 and receive, in return, mappings of custom data fields 642 and relevant text. Application 640 uses these mappings to populate the custom data fields 642 with the relevant text.

Data extractor 650 may correspond to data extractor 124 illustrated in FIG. 1. Generally, data extractor 650 includes a classifier model 652 and a question-answering model 654. The classifier model 652 generally ingests freeform text samples and the names of custom data fields and identifies custom data fields for which the freeform text samples have relevant information. Meanwhile, the question-answering model 654 generates mappings between the identified custom data fields and the relevant portions of the freeform text samples.

Example Clauses

Implementation details of various aspects of the present disclosure are described in the following numbered clauses.

Clause 1: A method, comprising: generating, via a natural language processing pipeline, a training data set from a data set of freeform text samples and field entries for a plurality of custom fields defined in a software application, each entry in the training data set including a mapping between a custom field name and relevant textual content in a freeform text sample in the data set; training a first machine learning model based on the training data set to identify custom fields for which relevant data is included in freeform text; and training a second machine learning model based on the training data set to extract content from the freeform text into one or more custom fields of the plurality of custom fields defined in the software application and identified by the first machine learning model as custom fields for which relevant data is included in the freeform text.

Clause 2: The method of Clause 1, wherein generating the training data set comprises, for each respective freeform text sample in the data set of freeform text samples: extracting, for a custom field name, relevant textual content in the respective freeform text sample based on a corresponding field entry; and generating an entry mapping the respective freeform text sample and custom field name to the relevant textual content.

Clause 3: The method of Clause 2, wherein the custom field name is not included in the respective freeform text sample, and the relevant textual content comprises a null identifier.

Clause 4: The method of any one of Clauses 1 through 3, further comprising identifying a set of custom field names, including the custom field name from the data set of freeform text samples, based on sequences of words repeated across freeform text samples in the data set of freeform text samples.

Clause 5: The method of Clause 4, wherein the natural language processing pipeline comprises a topic modeling algorithm that identifies the set of custom field names.

Clause 6: The method of Clause 5, wherein the topic modeling algorithm comprises a Latent Dirichlet allocation model trained to identify custom field names based on the data set of freeform text samples.

Clause 7: The method of any one of Clauses 1 through 6, wherein the second machine learning model is configured to extract content from freeform text for any custom field defined within an instance of a software application.

Clause 8: The method of any one of Clauses 1 through 7, wherein: the first machine learning model comprises a classifier model configured to determine whether relevant text for a custom field defined in the software application exists in the freeform text sample, and the second machine learning model comprises a question-answering model configured to identify the relevant text for the custom field defined in the software application.

Clause 9: The method of Clause 8, wherein the first machine learning model is further configured to match custom fields defined in the software application to custom fields defined in the classifier model based on fuzzy text matching.

Clause 10: The method of any one of Clauses 8 or 9, wherein the question-answering model comprises a bidirectional encoder representation from transformer (BERT) model.

Clause 11: The method of any one of Clauses 1 through 10, further comprising deploying the first machine learning model and the second machine learning model.

Clause 12: A method, comprising: receiving a freeform text sample; identifying, based on a machine learning model, custom fields in a software application for which relevant content is included in the freeform text sample; extracting, based on the machine learning model, mappings between the identified custom fields and relevant content in the freeform text sample; and for each respective mapping between a respective custom field and respective relevant content, updating the respective custom field with the respective relevant content in the freeform text sample.

Clause 13: The method of Clause 12, further comprising identifying a set of custom field names including the custom field name from a data set of freeform text samples associated with a user of the software application based on sequences of words repeated across freeform text samples in the data set of freeform text samples.

Clause 14: The method of Clause 13, wherein identifying the set of custom field names comprises identifying the set of custom field names based on a topic modeling algorithm.

Clause 15: The method of Clause 14, wherein the topic modeling algorithm comprises a Latent Dirichlet allocation model trained to identify custom field names based on a data set of freeform text samples.

Clause 16: The method of any one of Clauses 12 through 15, wherein the machine learning model is configured to extract content from freeform text for any custom field defined within an instance of a software application.

Clause 17: The method of any one of Clauses 12 through 16, wherein extracting the mappings between custom fields and relevant content in the freeform text sample is performed in real-time.

Clause 18: The method of any one of Clauses 12 through 17, wherein the machine learning model comprises: a classifier model configured to determine whether relevant text for each respective custom field of the custom fields in the software application exists in the freeform text sample, and a question-answering model configured to identify the relevant text for the identified custom fields from the freeform text sample.

Clause 19: The method of any one of Clauses 12 through 18, further comprising determining that the freeform text sample includes relevant content for one or more custom fields using a natural language processing pipeline configured to identify one or more words in the freeform text sample matching one or more custom field names in a universe of custom field names defined by users of the software application.

Clause 20: An apparatus comprising: a memory having executable instructions stored thereon; and a processor configured to execute the executable instructions to cause the apparatus to perform the operations of any one of Clauses 1 through 19.

Clause 21: An apparatus comprising: means for performing the operations of any one of Clauses 1 through 19.

Clause 22: A computer-readable medium having instructions stored thereon which, when executed by a processor, performs the operations of any one of Clauses 1 through 19.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
generating, via a natural language processing pipeline, a training data set from a data set of freeform text samples and field entries for a plurality of custom fields defined by users of a software application, each entry in the training data set including a mapping between a custom field name and relevant textual content in a freeform text sample in the data set;
training a first machine learning model based on the training data set to identify custom fields for which relevant data is included in any freeform text, wherein the custom fields comprise fields not included in a set of defined fields in the software applications, and wherein the first machine learning model comprises a classifier model configured to determine whether relevant text for a custom field exists in the freeform text sample; and
training a second machine learning model based on the training data set to extract content from the freeform text samples into one or more custom fields of the plurality of custom fields defined in the software application and identified by the first machine learning model as custom fields for which relevant data is included in the freeform text samples, wherein the second machine learning model comprises a question-answering model configured to identify the relevant text for the custom field.

2. The method of claim 1, wherein generating the training data set comprises, for each respective freeform text sample in the data set of freeform text samples:

extracting, for a custom field of the plurality of custom fields, relevant textual content in the respective freeform text sample based on a corresponding field entry; and
generating an entry mapping the respective freeform text sample and custom field name to the relevant textual content.

3. The method of claim 2, wherein the custom field name is not included in the respective freeform text sample, and the relevant textual content comprises a null identifier.

4. The method of claim 1, further comprising identifying a set of custom field names, including the custom field name from the data set of freeform text samples, based on sequences of words repeated across freeform text samples in the data set of freeform text samples.

5. The method of claim 4, wherein the natural language processing pipeline comprises a topic modeling algorithm that identifies the set of custom field names.

6. The method of claim 5, wherein the topic modeling algorithm comprises a Latent Dirichlet allocation model trained to identify custom field names based on the data set of freeform text samples.

7. The method of claim 1, wherein the second machine learning model is configured to extract content from freeform text for any custom field defined within an instance of the software application.

8. The method of claim 1, wherein the first machine learning model is further configured to match custom fields defined in the software application to custom fields defined in the classifier model based on fuzzy text matching.

9. The method of claim 1, wherein the question-answering model comprises a bidirectional encoder representation from transformer (BERT) model.

10. The method of claim 1, further comprising deploying the first machine learning model and the second machine learning model.

11. A method, comprising:
receiving a freeform text sample;
identifying, based on a first machine learning model, custom fields in a software application for which relevant content is included in the freeform text sample, wherein the custom fields comprise fields not included in a set of defined fields in the software applications, and wherein the first machine learning model comprises a classifier model configured to determine whether relevant text for a custom field exists in the freeform text sample;
extracting, based on a second machine learning model, mappings between the identified custom fields and relevant content in the freeform text sample, wherein the second machine learning model comprises a question-answering model configured to identify the relevant text for the custom field; and
for each respective mapping between a respective custom field and respective relevant content, updating the respective custom field with the respective relevant content in the freeform text sample.

12. The method of claim 11, further comprising identifying a set of custom field names including the custom field name from a data set of freeform text samples associated with a user of the software application based on sequences of words repeated across freeform text samples in the data set of freeform text samples.

13. The method of claim 12, wherein identifying the set of custom field names comprises identifying the set of custom field names based on a topic modeling algorithm.

14. The method of claim 13, wherein the topic modeling algorithm comprises a Latent Dirichlet allocation model trained to identify custom field names based on a data set of freeform text samples.

15. The method of claim 11, wherein the second machine learning model is configured to extract content from freeform text for any custom field defined within an instance of the software application.

16. The method of claim 11, wherein extracting the mappings between custom fields and relevant content in the freeform text sample is performed in real-time.

17. The method of claim 11, further comprising determining that the freeform text sample includes relevant content for one or more custom fields using a natural language processing pipeline configured to identify one or more words in the freeform text sample matching one or more custom field names in a universe of custom field names defined by users of the software application.

18. A system, comprising:
a memory having executable instructions stored thereon; and
a processor configured to execute the executable instructions to cause the system to:
receive a freeform text sample;
identify, based on a first machine learning model, custom fields in a software application for which relevant content is included in the freeform text sample, wherein the custom fields comprise fields not included in a set of defined fields in the software applications, and wherein the first machine learning model comprises a classifier model configured to determine whether relevant text for a custom field exists in the freeform text sample;
extract, based on a second machine learning model, mappings between the identified custom fields and relevant content in the freeform text sample, wherein the second machine learning model comprises a question-answering model configured to identify the relevant text for the custom field; and
for each respective mapping between a respective custom field and respective relevant content, update the respective custom field with the respective relevant content in the freeform text sample.

* * * * *